(12) United States Patent
Abedini et al.

(10) Patent No.: US 10,320,475 B2
(45) Date of Patent: Jun. 11, 2019

(54) POWER CONTROL IN ASSISTED MILLIMETER WAVE INITIAL ACCESS

(71) Applicant: QUALCOMM Incorporated, San Diego, CA (US)

(72) Inventors: Navid Abedini, Raritan, NJ (US); Bilal Sadiq, Basking Ridge, NJ (US); Sundar Subramanian, Bridgewater, NJ (US); Muhammad Nazmul Islam, Edison, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/673,114

(22) Filed: Aug. 9, 2017

(65) Prior Publication Data

US 2018/0115363 A1  Apr. 26, 2018

Related U.S. Application Data

(60) Provisional application No. 62/411,437, filed on Oct. 21, 2016.

(51) Int. Cl.
| | |
|---|---|
| H04B 7/26 | (2006.01) |
| H04W 16/28 | (2009.01) |
| H04B 7/08 | (2006.01) |
| H04B 7/06 | (2006.01) |
| H04B 7/0426 | (2017.01) |

(Continued)

(52) U.S. Cl.
CPC ......... *H04B 7/2684* (2013.01); *H04B 7/0426* (2013.01); *H04B 7/0617* (2013.01); *H04B 7/0623* (2013.01); *H04B 7/0814* (2013.01); *H04B 7/0834* (2013.01); *H04B 7/2606* (2013.01); *H04W 16/28* (2013.01); *H04W 52/146* (2013.01); *H04W 52/50* (2013.01); *H04W 52/283* (2013.01); *H04W 52/325* (2013.01); *H04W 52/367* (2013.01); *H04W 52/42* (2013.01); *H04W 74/0833* (2013.01)

(58) Field of Classification Search
None
See application file for complete search history.

(56) References Cited

U.S. PATENT DOCUMENTS 9,674,374 B1 * 6/2017 Bolton ................. H04M 15/88
2003/0021254 A1   1/2003 Fukuda
(Continued)

FOREIGN PATENT DOCUMENTS

WO   WO-2015186824 A1   12/2015

OTHER PUBLICATIONS

International Search Report and Written Opinion—PCT/US2017/056782—ISA/EPO—dated Dec. 15, 2017.

*Primary Examiner* — Mohammed Rachedine
(74) *Attorney, Agent, or Firm* — Patterson & Sheridan, LLP

(57) ABSTRACT

Certain aspects of the present disclosure provide techniques for assisted power control for an uplink signal transmitted during a RACH procedure. A UE may determine a transmit power for transmitting a message during a RACH procedure with a secondary BS, based at least in part, on communication between the UE and a primary BS. The UE may transmit the message to the second BS during the RACH procedure based, at least in part, on the determined transmit power.

26 Claims, 9 Drawing Sheets

(51) Int. Cl.

| | |
|---|---|
| *H04W 52/14* | (2009.01) |
| *H04W 52/50* | (2009.01) |
| *H04W 52/28* | (2009.01) |
| *H04W 52/32* | (2009.01) |
| *H04W 52/36* | (2009.01) |
| *H04W 52/42* | (2009.01) |
| *H04W 74/08* | (2009.01) |

(56) References Cited

U.S. PATENT DOCUMENTS

| | | | |
|---|---|---|---|
| 2013/0121231 A1* | 5/2013 | Kim | H04L 12/189 |
| | | | 370/312 |
| 2013/0237245 A1 | 9/2013 | Tinnakornsrisuphap et al. | |
| 2013/0329631 A1 | 12/2013 | Alam et al. | |
| 2016/0165605 A1* | 6/2016 | Dimou | H04B 7/0617 |
| | | | 370/329 |
| 2017/0055298 A1* | 2/2017 | Pawar | H04L 5/1469 |
| 2017/0202025 A1* | 7/2017 | Ouchi | H04W 16/32 |

* cited by examiner

POWER CONTROL IN ASSISTED MILLIMETER WAVE INITIAL ACCESS

CROSS-REFERENCE TO RELATED APPLICATIONS

This application claims priority to U.S. Provisional Application Ser. No. 62/411,437, entitled "POWER CONTROL IN ASSISTED MILLIMETER WAVE INITIAL ACCESS," filed Oct. 21, 2016, which is expressly incorporated by reference herein in its entirety.

INTRODUCTION

Aspects of the present disclosure relate to wireless communications, and more particularly, to a base station (BS) assisting a user equipment (UE) in establishing initial access with another BS.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

Certain aspects of the present disclosure relate to methods and apparatus for assisting a UE in performing initial access to a BS. As described herein, one BS (e.g., BS A) may assist the UE in determining a transmit power control for use during a random access channel (RACH) procedure with another BS (e.g., BS B). The two BSs may operate in different frequency spectrums. For example the other base station (e.g., BS B) may operate in an mmWave spectrum. The BS providing assistance (e.g., BS A) may operate in a lower frequency spectrum than the mmWave spectrum. According to one example, BS A, which provides the assistance information, may be a master BS. BS B may be a secondary BS.

Certain aspects of the present disclosure provide a method for wireless communication that may be performed, for example, by a UE. The method includes determining a transmit power for transmitting a message during a random access channel (RACH) procedure with a first base station (BS), based at least in part, on communication between the UE and a second BS and transmitting the message to the first BS during the RACH procedure based, at least in part, on the determined transmit power.

Certain aspects of the present disclosure provide an apparatus for wireless communication that may be performed, for example, by a UE. The apparatus includes means for determining a transmit power for transmitting a message during a random access channel (RACH) procedure with a first base station (BS), based at least in part, on communication between the UE and a second BS and means for transmitting the message to the first BS during the RACH procedure based, at least in part, on the determined transmit power.

Certain aspects of the present disclosure provide an apparatus for wireless communication that may be performed, for example, by a UE. The apparatus includes at least one processor and a memory coupled to the at least one processor. The at least one processor is configured to determine a transmit power for transmitting a message during a random access channel (RACH) procedure with a first base station (BS), based at least in part, on communication between the UE and a second BS and transmit the message to the first BS during the RACH procedure based, at least in part, on the determined transmit power.

Certain aspects of the present disclosure provide a computer readable medium storing computer executable code for causing a UE to determine a transmit power for transmitting a message during a random access channel (RACH) procedure with a first base station (BS), based at least in part, on communication between the UE and a second BS and transmit the message to the first BS during the RACH procedure based, at least in part, on the determined transmit power.

Certain aspects of the present disclosure provide a method for wireless communication that may be performed, for example, by a first BS. The first BS may be a master BS. The method includes communicating with a user equipment (UE) and taking one or more actions to assist the UE in setting a transmit power for transmitting a message during a random access channel (RACH) procedure with a second BS, based at least in part, on the communication between the UE and the first BS. The second BS may operate in an mmWave spectrum.

Certain aspects of the present disclosure provide an apparatus for wireless communication that may be performed, for example, by a first BS. The apparatus includes means for communicating with a user equipment (UE) and means for taking one or more actions to assist the UE in setting a transmit power for transmitting a message during a random access channel (RACH) procedure with a second BS, based at least in part, on the communication between the UE and the first BS.

Certain aspects of the present disclosure provide an apparatus for wireless communication that may be performed, for example, by a first BS. The apparatus includes at least one processor and a memory coupled to the at least one processor. The at least one processor is configured to communicate with a user equipment (UE) and take one or more actions to assist the UE in setting a transmit power for transmitting a message during a random access channel (RACH) procedure with a second BS, based at least in part, on the communication between the UE and the first BS.

Certain aspects of the present disclosure provide a computer readable medium storing computer executable code for causing a first BS to communicate with a user equipment (UE) and take one or more actions to assist the UE in setting a transmit power for transmitting a message during a random access channel (RACH) procedure with a second BS, based at least in part, on the communication between the UE and the first BS.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
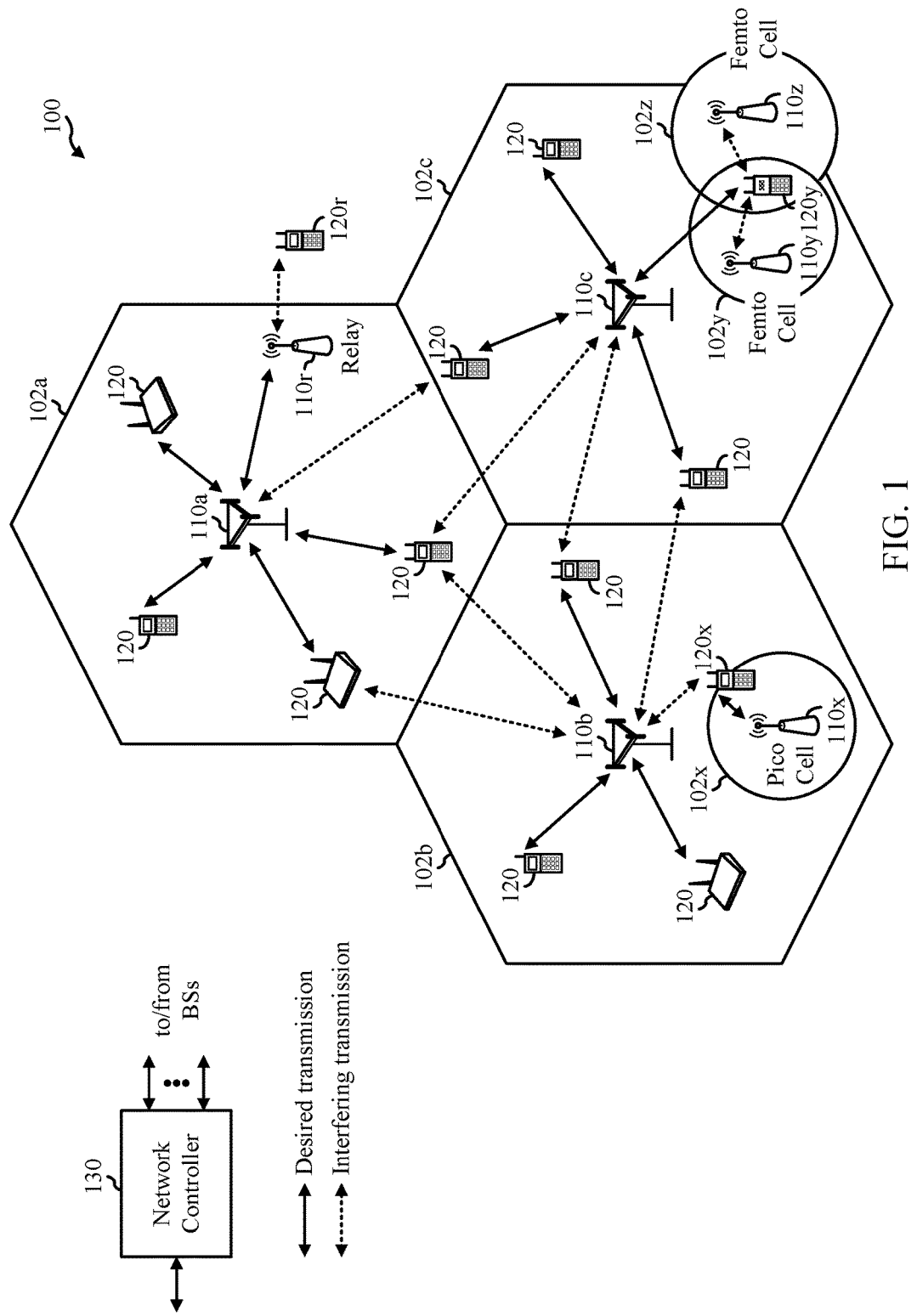
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. According to an example, the wireless network may be a NR or 5G network. NR wireless communication systems may employ beams, where a BS and UE communicate via active beams. In scenarios where a BS may communicate with a UE using active beams, the UE may benefit from assistance in determining a transmit power to use for transmitting a message during a random access channel (RACH) procedure.

Aspects of the present disclosure provide techniques and apparatus for assisting a UE in determining a transmit power for use during a RACH procedure. According to one example, a UE may want to establish communication with a BS operating in an mmWave frequency spectrum. The UE may receive assistance information for determining the transmit power to use during the RACH procedure from a BS operating in a lower frequency spectrum than the mmWave spectrum. The UE may use the assistance information when performing the RACH procedure with the BS operating in the mmWave frequency spectrum.

For illustrative purposes, aspects are described with reference to a primary BS and a secondary BS, wherein the secondary BS operates in an mmWave frequency spectrum and the primary BS operations in a lower frequency spectrum that the secondary spectrum; however, aspects may not be limited to this example scenario.

More generically, the UE may receive assistance information from one BS, wherein the assistance information may be used to determine power control for transmissions during a RACH procedure with another BS. The BS providing the assistance information may operate in a different frequency spectrum than the BS to which the UE transmits the RACH signaling using the determined power control.

Figure 8:
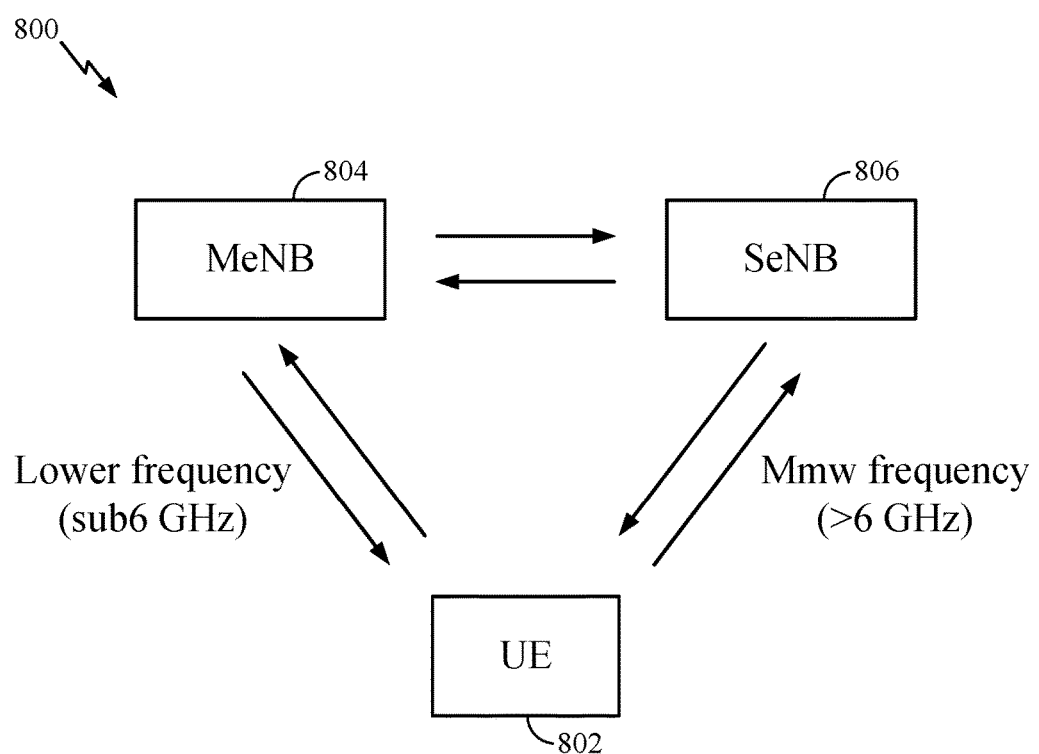
FIG. 8 illustrates an example wireless communication system, in which aspects of the present disclosure may be implemented.

As described herein, for example, with respect to FIG. 8, a UE's initial access to a BS communicating via beams may be simplified with assistance from a BS operating in a lower frequency spectrum. With the assistance of the BS operating in a lower frequency spectrum, mmWave resources may be conserved and, in certain scenarios, initial synchronization to the mmWave network may completely or partly be bypassed.

UEs 120 may be configured to perform the operations 900 and methods described herein for determining a transmit power. BS 110 may comprise a transmission reception point (TRP), Node B (NB), 5G NB, access point (AP), new radio (NR) BS, Master BS, primary BS, etc.). The NR network 100 may include the central unit. The BS 110 may perform the operations 1000 and other methods described herein for providing assistance to a UE in determining a transmit power to use during a RACH procedure with another BS (e.g., a secondary BS).

A UE 120 may determine a transmit power for transmitting a message during a RACH procedure with a secondary BS, based at least in part, on communication between the UE and a primary BS. The UE may transmit the message to the secondary BS during the RACH procedure based, at least in part, on the determined transmit power.

A BS 110, such as a master BS or a primary BS, may communicate with the UE and may take one or more actions to assist the UE in setting a transmit power for transmitting a message during the RACH procedure with a secondary BS.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
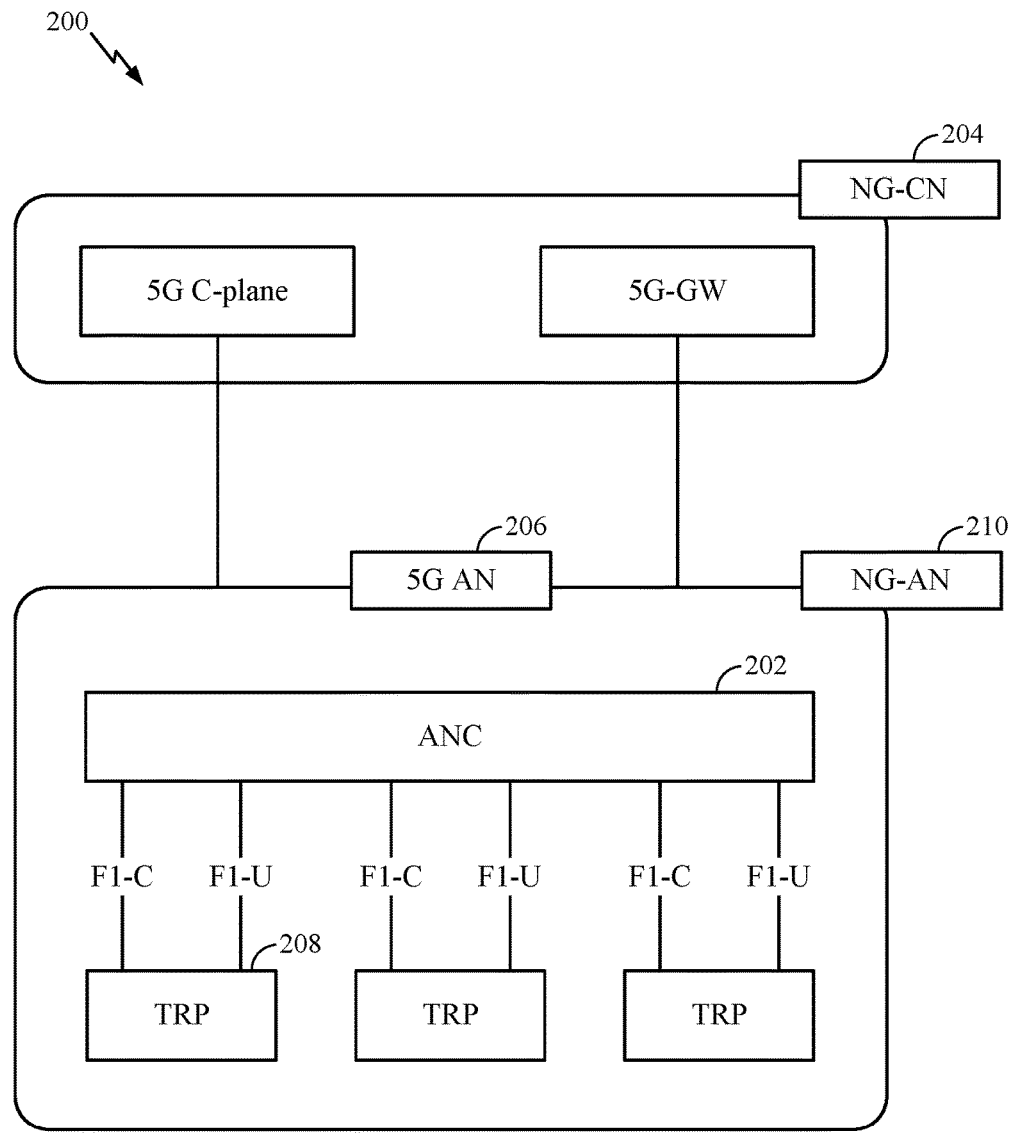
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
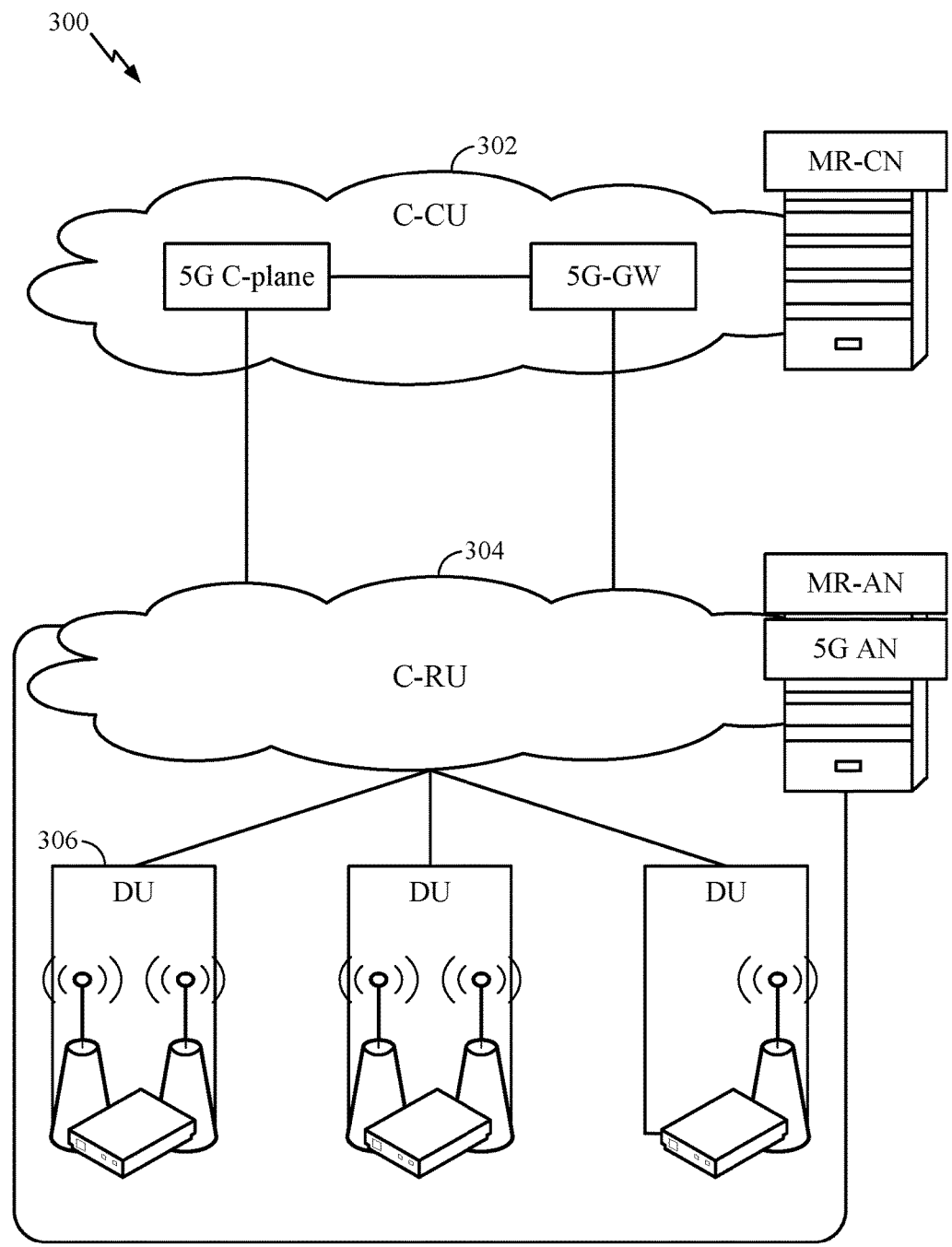
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
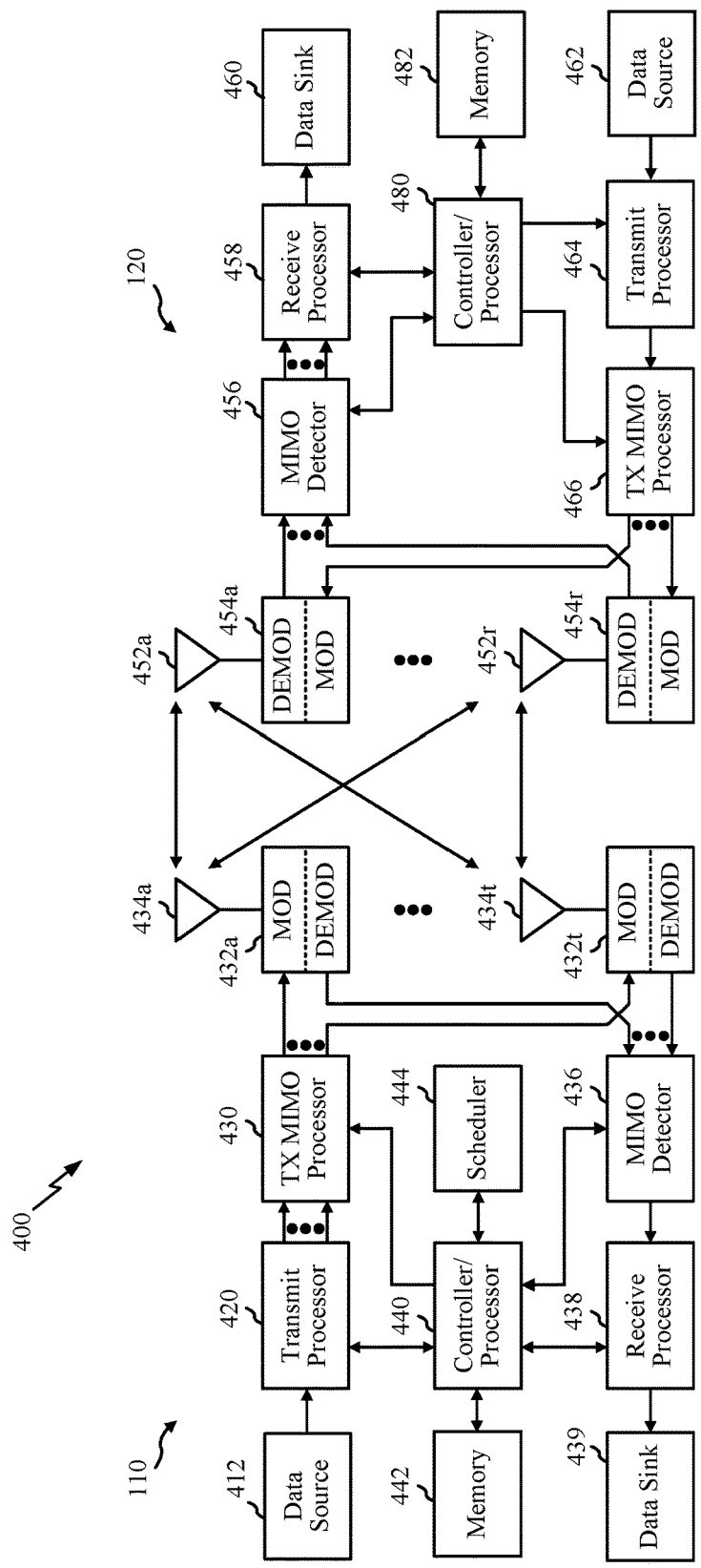
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

According to an example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

As an example, one or more of the antennas 452, Tx/Rx 454, processors 466, 458, 464, and/or controller/processor 480, and DEMODs 454 of the UE 120 may be configured to receive assistance information from a BS for use during a RACH procedure with another BS. One or more of the components illustrated in FIG. 4 are configured to determine a transmit power for transmitting a message during a random access channel (RACH) procedure with a first base station (BS), based at least in part, on communication between the UE and a second BS and transmit the message to the first BS during the RACH procedure based, at least in part, on the determined transmit power.

As another example, antennas 434, processors 420, 430, 438, and/or controller/processor 440, and DEMODs 432 of the BS 110 are configured to provide the assistance information to a UE for use by the UE during a RACH procedure with another BS. One or more of the components illustrated in FIG. 4 are configured to communicate with a user equipment (UE), and take one or more actions to assist the UE in setting a transmit power for transmitting a message during a random access channel (RACH) procedure with a second BS, based at least in part, on the communication between the UE and the first BS.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein and those illustrated in the appended drawings. A scheduler 444 may schedule UEs for data transmission on the downlink and/or uplink. The processor 480 and/or other processors and modules at the UE 120 may perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively.

Figure 5:
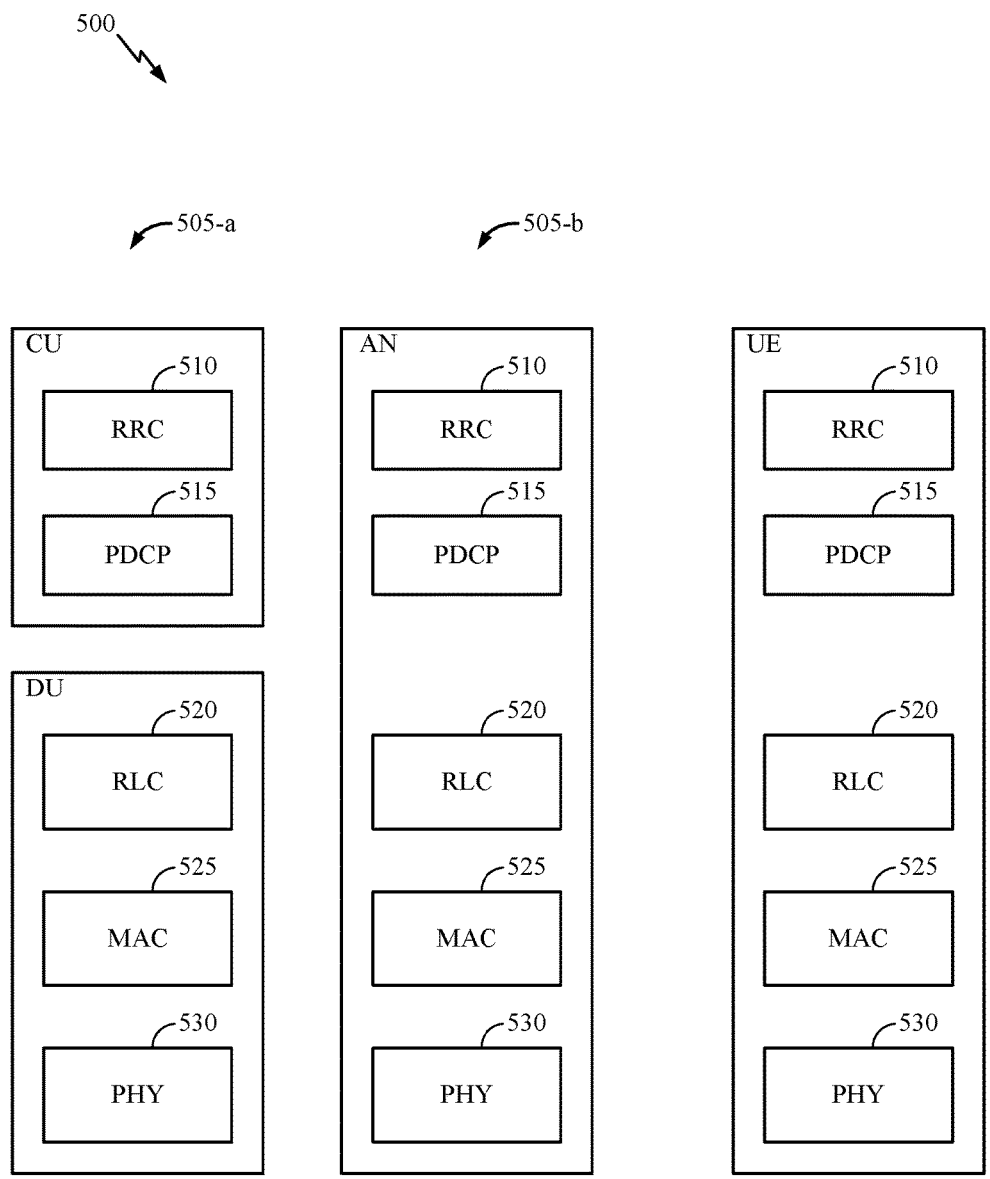
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
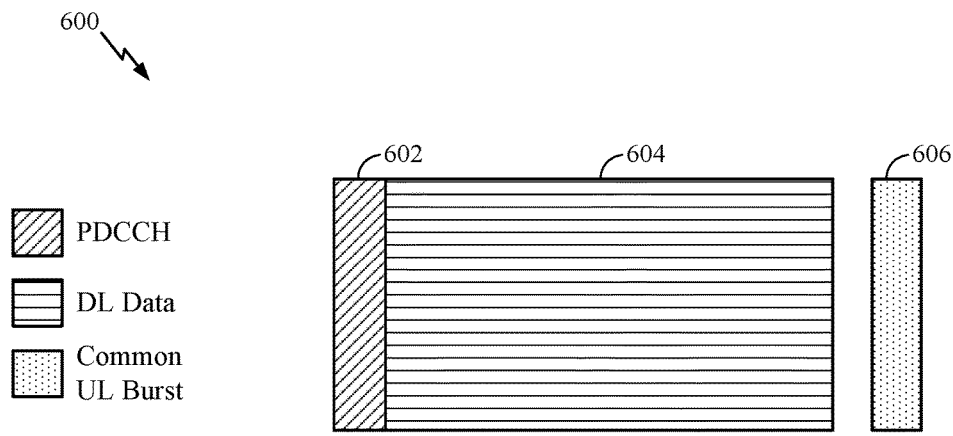
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
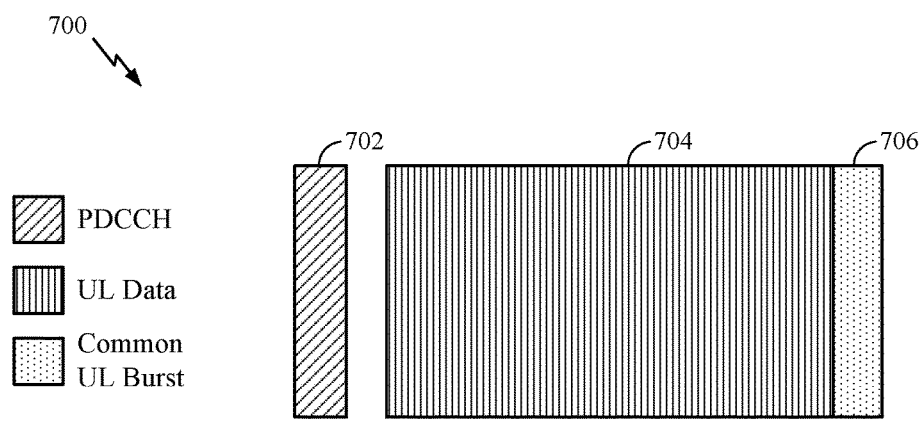
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Assisted mmWave Access

FIG. 8 illustrates an example 800 of an assisted mmWave access process. A UE 802 may want to access a BS 806. The BS 806 may be a secondary BS (SeNB) that operates in an mmWave spectrum. Another BS, such as BS 804, may assist the UE in accessing the BS 806. According to an example, BS 804 may be a primary BS (MeNB) that operates in a lower frequency spectrum as compared to the BS 806. The BSs 804 and 806 may communicate with each other.

According to aspects, the BSs 804 and 806 may be co-located. The BS 806 and UE 802 may communicate with each other using beams.

As described above, mmWave communication may be beam-formed, wherein wireless devices may communicate using directional beams. A UE 802 receiving assistance, from BS 804, in accessing the BS 806 may simplify access to the mmWave network. Additionally, assistance from the BS 804 may help conserve mmWave resources. The conserved resources may increase flexibility in the mmWave network. For example, the BS 806 may flexibly (e.g., dynamically) allocate directional synchronization and directional RACH resources per demands of UEs.

Typically, UE's initial access to a network may involve performing synchronization to acquire time, frequency, and system information of the serving BS. After synchronization, the UE may transmit a RACH preamble to identify itself to BS. The UE and BS may complete the initial access process by exchanging additional messages, including a Random Access Response (message 2), message 3, and message 4 during a RACH procedure. According to aspects of the present disclosure, a UE 802 may advantageously not perform synchronization to the BS 806 prior to transmitting the RACH preamble.

Synchronization and random access (RACH) in an mmWave system may include the transmission and reception of beam-formed signals. Thus, synchronization and random access may be referred to as directional SYNC and directional RACH. Synchronization and random access in lower frequency wireless communication system may be referred to as SYNC and RACH.

Two modes of directional SYNC and directional RACH may exist: (1) assisted directional SYNC/RACH and (2) typical, directional SYNC/RACH. Assisted directional SYNC/RACH may involve assistance from a BS 804 (operating in a lower frequency than BS 806) in performing synchronization to/random access with the BS 806. The configuration of assisted directional SYNC/RACH may be UE-specific. Typical directional SYNC/RACH may not include assistance from the BS 804. The configuration for typical, directional SYNC/RACH may be system/cell-specific and not UE-specific.

As used herein, the term mmWave generally refers to spectrum bands in very high frequencies such as, for example, 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, when a UE performs initial access with an mmWave base station (e.g., an SeNB).

Example Power Control Assistance

In assisted mmWave access, different modes of operation may exist based on the level of involvement of a primary BS. In one example, the primary BS may provide a UE with minimum information needed to transmit a directional RACH preamble to a secondary BS.

With reference to FIG. 8, the BS 804 may provide the UE 802 with a minimum amount of information, such as the time/frequency resources for directional RACH transmission and directional RACH preamble configuration (e.g., choices of Zadoff-Chu root/cyclic shift) for use in communicating with the BS 806. According to certain aspects of the present disclosure, the UE 802 may, advantageously, not perform directional SYNC to the BS 806. The UE may bypass synchronization because of the assistance received from the BS 804. Since the UE may not perform directional SYNC with the BS 806, a problem may arise in determining a transmit power for use by the UE during a RACH procedure with the BS 806.

RACH transmissions are typically power controlled so that the RACH preambles transmitted by different UEs arrive at a BS within an acceptable power range. The acceptable range may correspond to the dynamic range of the BS receiver. The UE may determine the transmit power it uses during a RACH procedure. Power control at the UE may allow a BS to receive transmissions from multiple UEs at the same time on the same resources within an acceptable power range (e.g., roughly at the same power). Stated otherwise, UE transmit power control may help ensure that transmissions from multiple UEs are not received at the BS with very different power levels.

During typical synchronization, the UE may receive a downlink reference signal (RS) from a BS. The reference signal may include, for example, synchronization signals (e.g., PSS, SSS, or RS) or beam reference signals (BRS). The UE may calculate a reference signal receive power (RSRP) associated with the received RS. The UE may also receive an indication of the transmit power used by the BS to transmit the downlink RS. This information may be received in a master information block (MIB). Based on the RSRP and indication of the transmit power used by the BS, the UE may calculate pathloss. The UE may set its transmit power based, at least in part, on the determined pathloss and the receive power the BS needs for reception of a RACH message. Thus, in a typical synchronization process, the UE may set its transmit power based on a received downlink RS.

When the UE bypasses a synchronization procedure with the BS 806, the UE may not receive a synchronization signal from the BS 806 prior to transmitting a directional RACH. Accordingly, the UE may not perform conventional power control. Aspects of the present disclosure provide methods and apparatus for a UE to determine (e.g., set) a transmit power for performing a RACH procedure with the BS 806.

Figure 9:
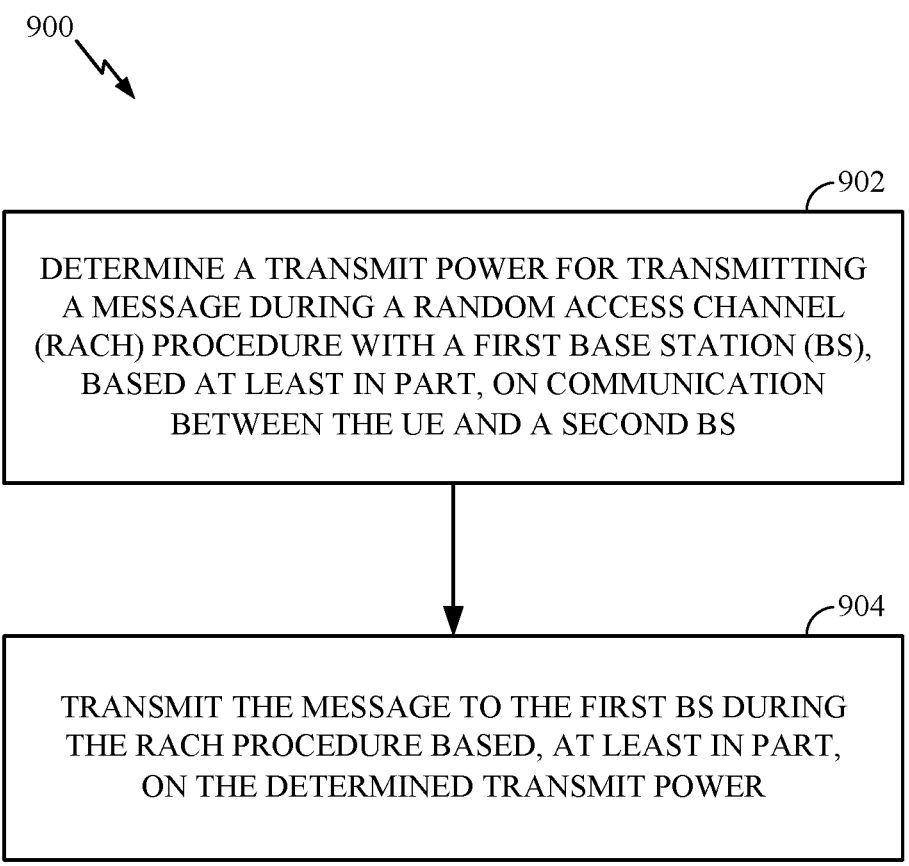
FIG. 9 illustrates example operations performed by a UE, in accordance with certain aspects of the present disclosure.

FIG. 9 illustrates example operations 900 which may be performed by UE, according to aspects of the present disclosure. The UE may include one or more modules of the UE 120 illustrated in FIG. 4. The UE 120 may communicate with a primary BS and a secondary BS. According to an example, the UE may communicate with the secondary BS using beams.

At 902, the UE may determine a transmit power for transmitting a message during a RACH procedure with a secondary BS based at least in part, on communication between the UE and a primary BS. At 904, the UE may transmit the message to the secondary BS during the RACH procedure based, at least in part, on the determined transmit power.

Figure 10:
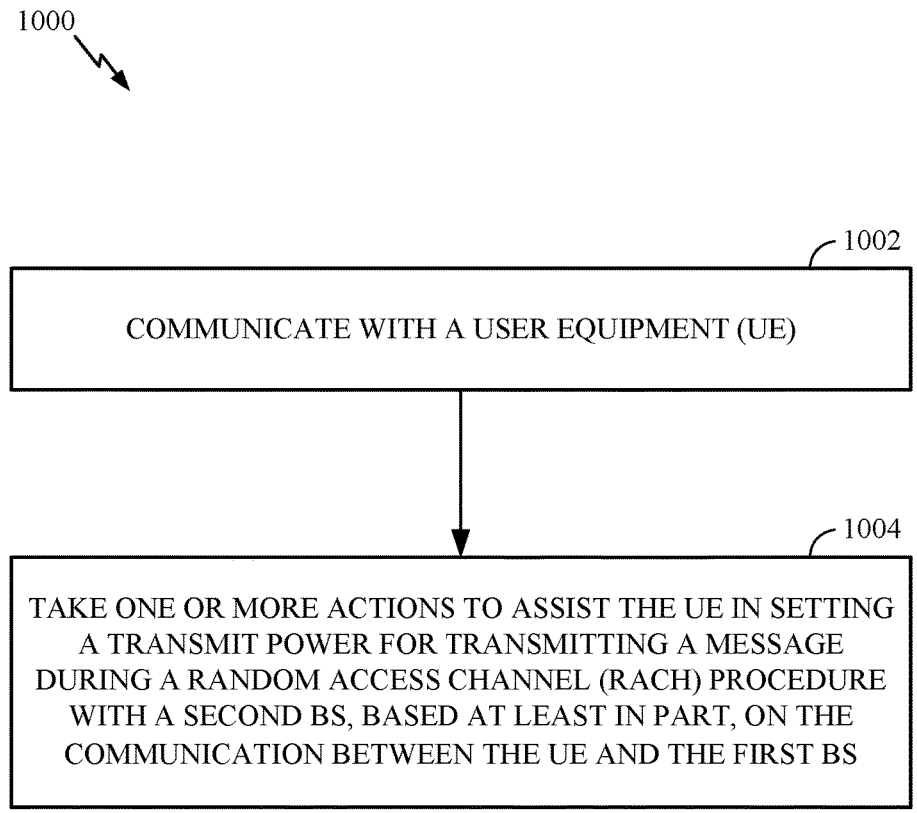
FIG. 10 illustrates example operations performed by a BS, in accordance with certain aspects of the present disclosure.

FIG. 10 illustrates example operations, which may be performed by BS, according to aspects of the present disclosure. The BS may include one or more modules of the BS 110 illustrated in FIG. 4. The BS 110 may be a primary BS that may communicate with a secondary BS (e.g., not illustrated in FIG. 4).

At 1002, the primary BS may communicate with a UE. At 1004, the primary BS may take one or more actions to assist the UE in setting a transmit power for transmitting a message during a RACH procedure with a secondary BS, based at least in part, on the communication between the UE and the primary BS.

The primary BS 110 and the secondary BS may be geographically co-located. According to aspects, a single BS may include both the primary and the secondary BSs. For example, when operating in a first frequency spectrum, the BS may comprise the primary BS. When operating in a second frequency spectrum, the BS may comprise the secondary BS. Regardless of co-location, the secondary frequency spectrum may include mmWave frequencies. The first frequency spectrum may include frequencies lower than mmWave frequencies. The UE may transmit a directional RACH preamble transmission to the secondary BS based on the determined transmit power.

Transmit Power ($P_{Tx}$) Determined by the UE

According to aspects, the UE may determine the directional transmit power ($P_{Tx}$) for use in transmitting a RACH preamble to a BS. The determination of $P_{Tx}$ by the UE may be based on any combination of a measured received power of a RS (RSRP) transmitted by the primary BS ($P_{Rx\_M}$) and/or the location of the UE (e.g., global positioning system (GPS)-based position).

The determination of $P_{Tx}$ may be based on the RSRP ($P_{Rx\_M}$) of a RS transmitted from the primary BS. The UE may determine its proximity to the primary BS based on received downlink RS from the primary BS. Because the primary BS and the secondary BS may be co-located, the UE may also determine its proximity to the secondary BS based on the RS received from the primary BS. Ranges of $P_{Rx\_M}$ may be defined and/or configured. A $P_{Rx\_M}$ range may correspond to a $P_{Tx}$ or set of $P_{Txs}$ for use by the UE. Based on range of $P_{Rx\_M}$, the UE may select directional transmit power $P_{Tx}$ for use in transmitting the RACH preamble to the secondary BS.

According to one example, when $P_{Rx\_M} < P_{thresh}$, the UE may determine that it may not be proximate to the primary BS (e.g., the UE may be far away from the primary BS). Therefore, the UE may set $P_{Tx} = P_{max}$, as it may be safe for the UE to transmit using its maximum transmit power for directional RACH transmissions. When $P_{Rx\_M} \geq P_{thresh}$, the UE may determine that it may be close to the primary BS. Accordingly, the UE may set the transmit power to a power level less than a maximum power level (e.g., $P_{Tx} = P_{reduced} < P_{max}$).

Thus, the UE may determine a proximity level to the secondary BS based, at least in part, on the communication with the primary BS. The transmit power may be set based on the determined proximity level. As described above, when the UE is close the secondary BS or when the distance between the UE and the secondary BS is less than a threshold distance value, the UE may use a reduced power level for transmitting a RACH preamble. The reduced transmit power may be less than a maximum transmit power.

The UE may determine a proximity to the secondary BS, in part, based on the location of the UE. The location may be based on a GPS position of the UE and/or positioning services provided by the primary BS. With knowledge of the UE's location, the UE may determine its proximity to the secondary BS. The transmit power may be set, at least in part, based on the determined location of the UE relative to the secondary BS.

As described above, according to aspects, the UE may receive a RS from the primary BS. The UE may calculate a RSRP associated with the RS. The transmit power for the RACH preamble may be set based on the RSRP. For example, the UE may compare the RSRP of the RS to at least one threshold value. Based on the comparison, the UE may select a transmit power to use in the RACH procedure from a set of predetermined values.

According to one example, the UE may determine the RSRP of the RS is less than or equal to a threshold value. In response, the UE may set the transmit power for the RACH preamble to a maximum transmit power. According to another example, the UE may determine the RSRP of the RS is greater than a threshold value. In response, the UE may set the transmit power for the RACH preamble to a transmit power that is less than a maximum transmit power. In his manner, the UE may avoid transmitting a directional RACH preamble at a maximum power level when the UE is close to the secondary BS.

Transmit Power ($P_{Tx}$) Signaled by the Primary BS

In some cases, the primary BS may determine the $P_{Tx}$. The $P_{Tx}$ may be based on a combination of measurements associated with UL reference signals transmitted by the UE, additional information received from the UEs, and additional information received from other cells. The primary BS may transmit an indication of the transmit power to the UE. The UE may use the transmit power for transmitting the RACH preamble to the secondary BS.

The additional information received from the UE may include information about the UE's location (GPS-based position) or measured received power associated with transmissions from other cells in the system.

Additional information received from other cells, including the secondary BS 806, may include information associated with the configuration of the other cells, desired receive power of the other cells, or a power measurement from UEs in other cells.

Thus, the transmit power used for transmitting the directional RACH preamble by the UE may be based on an indication of the transmit power received from the primary BS. As described above, the UE may determine the transmit power based on RSRP of a downlink RS. Similarly, the BS may determine the transmit power based on the RSRP of a received uplink RS.

According to one example, the UE may transmit a RS to the primary BS. The primary BS may determine a transmit power to be used by the UE based on the RSRP associated with the uplink RS. Ranges of RSRP values may be defined and/or configurable. A range may correspond to a transmit power or a set of candidate transmit powers for the UE. Therefore, based on the measured uplink RSRP, the primary BS may determine the transmit power or set of candidate transmit powers for the UE. The primary BS may transmit an indication of the transmit power to the UE.

For example, the primary BS may compare the RSRP of the uplink RS to at least one threshold value. The primary BS may select a transmit power from a set of predetermined values based on the comparison. In response to determining the RSRP is less than or equal to a threshold value, the transmit power may be set to a maximum transmit power. In response to determining the RSRP is greater than a threshold value, the transmit power may be set to a reduced power level that is less than the maximum power.

The UE may transmit, to the primary BS, additional information including at least one of location information of the UE or measured received power associated with signal transmitted from at least one other BS. GPS location information and/or measured power of a signal received by the UE may be communicated to the primary BS. In this manner, the primary BS may determine the UE's proximity to the secondary BS based on communication with the UE. The transmit power of the message to the secondary BS during the RACH procedure may be based, at least in part, on information associated with the primary BS or measurements from other UEs.

Secondary BS Transmits Assisted Directional SYNC

As described above, a UE may bypass a synchronization process with the secondary BS. The techniques presented above may assist the UE in determining a transmit power to use during a RACH procedure, which may be especially helpful when the UE does not perform a synchronization process with the secondary BS.

In certain scenarios, however, the UE may be very close to the secondary BS. Therefore, accurate power control may be critical in an effort to avoid a large receive power at the secondary BS. The assistance provided by the UE may not be sufficient to accurately determine transmit power control. Thus, the secondary BS may transmit an assisted directional SYNC to the UE. The UE may receive the directional SYNC signal, perform power measurements on the directional SYNC signal, and determine power control for the directional RACH preamble transmissions based on the power measurements.

According to aspects, the determination of whether a UE is close to a secondary BS may be performed by the UE. The UE may use $P_{Rx\_M}$ and/or its location information to determine its proximity to the secondary BS. The UE may determine the distance between it and the secondary BS is less than a threshold distance value.

In response to determining the UE is close to the secondary BS, the UE may request the secondary BS transmit an assisted directional synchronization signal. The UE may transmit the request to the primary BS, and the primary BS may transmit the request of the directional synchronization signal to the secondary BS. In response to the received request, the secondary BS may determine the configuration and/or resources to be used for transmitting the directional synchronization signal to the UE, and may transmit an indication of the determined configuration and/or resources to the primary BS. The primary BS may transmit to the UE the indication of the configuration and/or resources to receive the directional synchronization signal. Thus, the primary BS may determine the configuration and/or resources directly from the secondary BS. According to aspects, the primary BS may determine the configuration and/or resources through other means such as communication with other BSs or communication with the core network via a backhaul connection. The UE may use the directional synchronization signal to determine a transmit power for transmitting the RACH preamble.

According to aspects, the determination of whether the UE is close to the secondary BS may be performed by the primary BS. The primary BS may determine the distance between the UE and the secondary BS is less than a threshold distance value. The primary BS may determine the proximity of the UE and the secondary BS based on RSs transmitted by the UE, location information associated with the UE, and/or a measured received power from the UE of signal transmitted from at least one other BS.

In response to determining the UE is close to the secondary BS, the primary BS may request the secondary BS to transmit a directional synchronization signal. In response to the received request, the secondary BS may determine the configuration and/or resources to be used for transmitting the directional synchronization signal to the UE, and may transmit an indication of the determined configuration and/or resources to the primary BS. The primary BS may transmit to the UE the indication of the configuration and/or resources to receive the directional synchronization signal. Thus, the primary BS may determine the configuration and/or resources directly from the secondary BS. According to aspects, the primary BS may determine the configuration and/or resources through other means such as communication with other BSs or communication with the core network via a backhaul connection. The UE may use the directional synchronization signal to determine a transmit power for transmitting the RACH preamble.

Aspects of the present disclosure provide techniques for assisting a UE in determining an appropriate transmit power level for transmitting a RACH message. Advantageously, the UE may determine the transmit power level without performing a synchronization procedure with the secondary BS. However, when the distance between the UE and the second BS is less than a threshold value (e.g., when the UE and the secondary BS are close), the secondary BS may transmit a directional synchronization signal, which may be used to determine a transmit power for the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   determining a transmit power for transmitting a message during a random access channel (RACH) procedure with a first base station (BS), based at least in part, on communication between the UE and a second BS by transmitting a reference signal (RS) to the second BS and receiving a directional synchronization signal from the first BS in response to the RS, wherein the transmit power is based, at least in part, on the received directional synchronization signal, wherein the first BS operates in a millimeter wave (mmWave) spectrum and the second BS operates in a different frequency spectrum;
   transmitting the message to the first BS during the RACH procedure based, at least in part, on the determined transmit power.

2. The method of claim 1, wherein the first and second BSs comprise co-located BSs.

3. The method of claim 1, wherein the message comprises a directional RACH preamble transmission.

4. The method of claim 1, further comprising:
   determining a proximity level to the first BS based, at least in part, on the communication with the second BS, wherein the transmit power is set based, at least in part, on the determined proximity level.

5. The method of claim 4, further comprising:
   determining the proximity level to the first BS is below a threshold value; and
   in response to the determining the proximity level to the first BS is below the threshold value, setting the transmit power to less than a maximum transmit power.

6. The method of claim 4, further comprising:
   determining a location of the UE based, at least in part, on any combination of a global positional system (GPS) position, and a positioning service provided by the second BS,
   wherein determining the proximity level to the first BS is based, at least in part, based on the determined location of the UE.

7. The method of claim 1, further comprising:
   receiving a reference signal (RS) from the second BS; and
   calculating a reference signal receive power (RSRP) associated with the RS,
   wherein the transmit power is set based, at least in part, on the RSRP.

8. The method of claim 7, wherein determining the transmit power further comprises:
   comparing the RSRP of the RS to at least one threshold value; and
   in response to the comparison, selecting the transmit power from a set of predetermined values.

9. The method of claim 1, wherein determination of the transmit power is further based on an indication of the transmit power received from the second BS.

10. The method of claim 9, further comprising:
    transmitting a reference signal (RS) to the second BS,
    wherein the indication of the transmit power received from the second BS is based on a reference signal receive power (RSRP) associated with the transmitted RS.

11. The method of claim 1, wherein determining the transmit power further comprises:
    determining a distance between the UE and the first BS is less than a threshold distance; and
    in response to the determination, transmitting a request to the first BS, via the second BS, for the directional synchronization signal.

12. The method of claim 1, further comprising:
    receiving, from the second BS, an indication of at least one of a configuration of the directional synchronization signal or resources used for transmission of the directional synchronization signal,
    wherein the directional synchronization signal is received based, at least in part, on the indication.

13. A method for wireless communication by a first base station (BS), comprising:
    communicating with a user equipment (UE); and
    taking one or more actions to assist the UE in setting a transmit power for transmitting a message during a random access channel (RACH) procedure with a second BS, based at least in part, on the communication between the UE and the first BS, wherein taking the one or more actions comprises receiving a first request, from the UE, for a directional synchronization signal from the second BS, and in response to the first request, transmitting, to the second BS, a second request for the directional synchronization signal, wherein the second BS operates in a millimeter wave (mmWave) spectrum and the first BS operates in a different frequency spectrum.

14. The method of claim 13, wherein the first and second BSs comprise co-located BSs.

15. The method of claim 13, wherein taking the one or more actions further comprises:
transmitting a reference signal (RS) to the UE,
wherein the transmit power is based, at least in part, on a reference signal receive power (RSRP) associated with the RS.

16. The method of claim 13, wherein taking the one or more actions further comprises:
transmitting an indication of the transmit power for transmitting the message during the RACH procedure.

17. The method of claim 13, wherein taking the one or more actions further comprises:
receiving a reference signal (RS) from the UE;
calculating a reference signal receive power (RSRP) associated with the RS; and
determining the transmit power for transmitting the message during the RACH procedure, based, at least in part, on the RSRP.

18. The method of claim 17, wherein determining the transmit power comprises:
comparing the RSRP of the RS to at least one threshold value; and
in response, selecting the transmit power from a set of predetermined values.

19. The method of claim 13, wherein taking the one or more further actions comprises:
determining a distance between the UE and the second BS is less than a threshold value; and
in response to the determining, transmitting, to the second BS, a request for the directional synchronization signal.

20. The method of claim 19, further comprising:
determining information associated with the directional synchronization signal transmitted by the second BS, wherein the information indicates at least one of a configuration of the directional synchronization signal or resources used for transmission of the directional synchronization signal; and
transmitting, to the UE, a message indicating the information.

21. The method of claim 19, further comprising:
receiving a reference signal (RS) from the UE; and
determining a reference signal received power (RSRP) associated with the received RS,
wherein the distance between the UE and the second BS is determined based, at least in part, on the RSRP.

22. An apparatus for wireless communication by a user equipment (UE), comprising at least one processor and memory coupled to the at least one processor, wherein the at least one processor is configured to:
determine a transmit power for transmitting a message during a random access channel (RACH) procedure with a first base station (BS), based at least in part, on communication between the UE and a second BS by transmitting a reference signal (RS) to the second BS and receiving a directional synchronization signal from the first BS in response to the RS, wherein the transmit power is based, at least in part, on the received directional synchronization signal, wherein the first BS operates in a millimeter wave (mmWave) spectrum and the second BS operates in a different frequency spectrum;
transmit the message to the first BS during the RACH procedure based, at least in part, on the determined transmit power.

23. The apparatus of claim 22, wherein the message comprises a directional RACH preamble transmission.

24. The apparatus of claim 22, wherein the at least one processor is configured to:
determine a proximity level to the first BS based, at least in part, on the communication with the second BS,
wherein the transmit power is set based, at least in part, on the determined proximity level.

25. An apparatus for wireless communication by a first base station (BS), comprising at least one processor and memory coupled to the at least one processor, wherein the at least one processor is configured to:
communicate with a user equipment (UE); and
take one or more actions to assist the UE in setting a transmit power for transmitting a message during a random access channel (RACH) procedure with a second BS, based at least in part, on the communication between the UE and the first BS, wherein taking the one or more actions comprises receiving a first request, from the UE, for a directional synchronization signal from the second BS, and in response to the first request, transmitting, to the second BS, a second request for the directional synchronization signal, wherein the second BS operates in a millimeter wave (mmWave) spectrum and the first BS operates in a different frequency spectrum.

26. The apparatus of claim 25, wherein taking the one or more actions comprises:
transmitting an indication of the transmit power for transmitting the message during the RACH procedure.

* * * * *